UNITED STATES PATENT OFFICE.

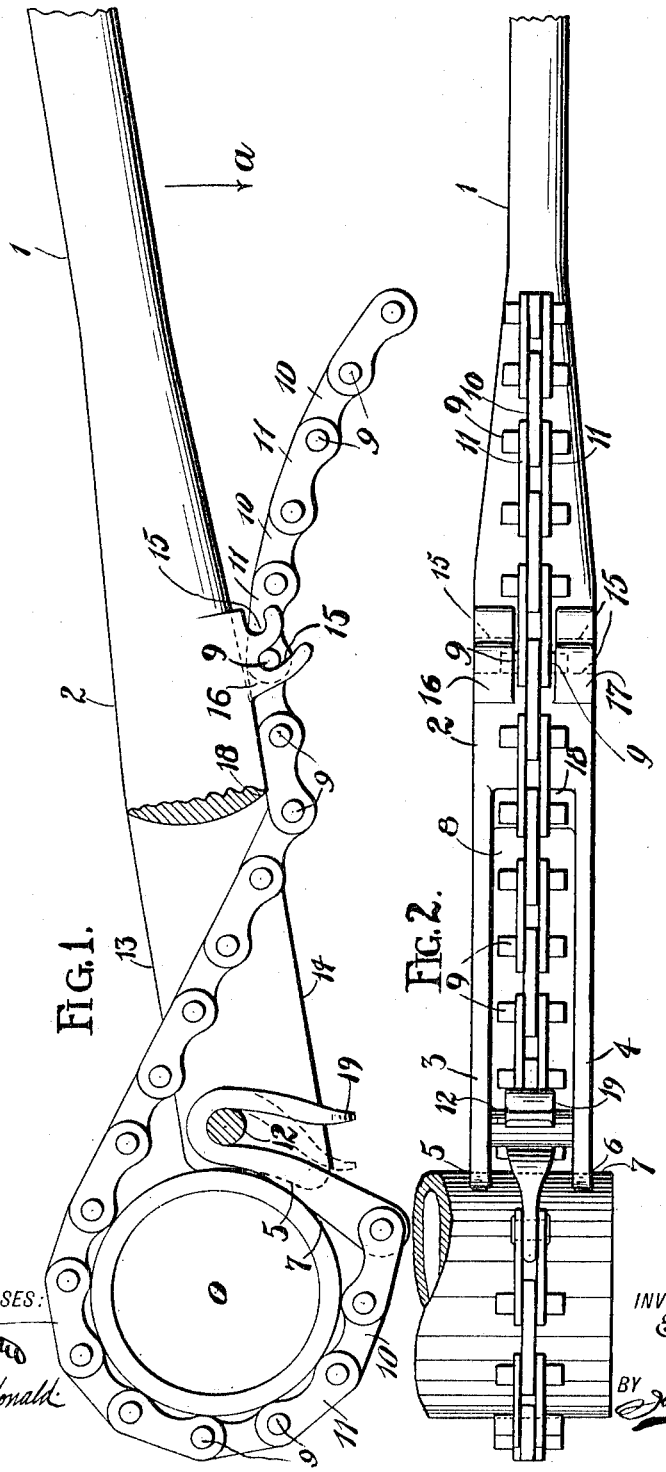

ELIJAH ENOSH BROWN, OF NEW WINDSOR, ILLINOIS.

PIPE-WRENCH.

1,116,378. Specification of Letters Patent. Patented Nov. 10, 1914.

Application filed October 31, 1913. Serial No. 798,389.

*To all whom it may concern:*

Be it known that I, ELIJAH ENOSH BROWN, a citizen of the United States, and resident of New Windsor, county of Mercer, and State of Illinois, have invented certain new and useful Improvements in Pipe-Wrenches, of which the following is a specification.

My invention relates to pipe-wrenches, more particularly to a pipe-wrench which employs a linked chain as a means to secure a firm grip upon and around the pipe.

The principal object of the invention is to provide a pipe-wrench of such construction as will enable it to be readily adjusted to positively grip pipes of different diameters and to obviate the necessity of employing any parts having serrated or toothed surfaces, as dogs or jaws, for engaging the pipe.
A further object is to provide a device of the character named which is simple in construction, durable and inexpensive.

These and other objects are attained by employing a construction comprising a chain and a simple lever having a bifurcated end, a bearing or post for attachment to the fixed end of the chain, and a slotted extension for engaging the several links of the chain, as will be hereinafter more fully described and specifically set forth in the annexed claims.

Reference is had to the accompanying drawings which form a part of this specification and in which—

Figure 1, is a side view, partly broken away, showing the wrench applied to a pipe in operative position; and Fig. 2, is an edge view of the device.

In the example of my invention shown in the drawings I have illustrated a preferable form of construction which I employ, but I do not wish to limit myself to this precise construction because slight modifications may be made without departing from the spirit and scope of my invention.
My preferred form of construction consists of a lever having a handle 1 and a bifurcated base or operative end 2, which comprises two members 3, 4, the ends of which are beveled and at an acute angle with the longer side of the bifurcated arms and preferably have concaved surfaces 5, 6, having bearing surfaces adapted to be fulcrumed against and frictionally engage a part of the periphery of a pipe, as 7. Between said members is an open space 8, which must be of sufficient width to allow free movement of the chain and the extended ends of its pins 9, which fasten the links 10, 11 together. The links of the chain have concaved inner edges, whereby a corrugated surface is provided for gripping the pipe. The lever further embodies a post 12, which extends across the width of said space 8, near the outer end, between the members 3, 4 and adjacent to the shorter sides thereof. The difference in the length of the sides of said members is caused by the angle of the bearing surfaces at the ends thereof, the sides 13, of said members 3, 4, being shorter than the sides 14. The lever is further provided with extensions 16, 17, having rearwardly directed slots 15, for engaging the extensions 9, of the chain pins. All parts of the lever are preferably formed integral and of either cast or wrought metal, whereby the device is not only very durable but also inexpensive.

By employing two holding slots 15, I get a wide range of adjustment for various sized pipes, because by this means the free end of the chain may be moved for the distance of half a link. The fixed end of the chain is preferably secured to the post 12, by means of the hook 19, whereby the chain is removable. But the bill of said hook may be bent over on its body part to retain the chain in place if desirable, as shown by dotted lines Fig. 1, of the drawings.

In operating the device the angles of the bearing surfaces of the lever are essential for the successful operation, as illustrated by Fig. 1, of the drawings, because it is readily seen that if a force applied to the handle tends to turn it in the direction of the arrow, *a*, the angularly extended surfaces 5 and 6, will have a wedging action which has a tendency to not only draw the chain taut but increase the distance between the center 0, of pipe 7 and the pin 9 which happens to be in the holding slot 15. As a result of this the gripping effect of the links on the pipe is increased proportionally to the force applied and a secure hold on the pipe is maintained. But movement of the lever in the opposite direction immediately releases the tension by allowing the chain to drop away from the shoulder 18. By the use of this construction direct tension, which the links 10 and 11 are subjected to, does not need to be sustained entirely by the pin 9, 11, which is in engagement with the slot 15.

Thus I provide an exceedingly durable, readily operable and inexpensive device which has no serrated jaws, dogs or other parts liable to become smooth and useless by wear against parts to be gripped.

Having thus described my invention, what I claim as new, and desire to secure by Letters Patent, is:

1. A pipe wrench comprising a lever having an integrally formed handle, a bifurcated bearing-end each arm thereof having a beveled end adapted to bear against a pipe, whereby each of the arms of said bifurcated end is provided with a long side and a short side, and a post seated in said ends adjacent to the short side and adapted to serve as means for securing a link chain; a link chain having a hook adapted to engage said post and link pins having projecting ends, said chain having a free end adapted to extend around a pipe and freely pass between the arms of the lever, said lever having corresponding slotted extensions adjacent to the juncture of said arms, and adapted for engaging the link-pins of the chain whereby one of the links is held in locked engagement with the body of the lever as required to secure the chain when the wrench is moved to turn the pipe, substantially as shown and described.

2. In a pipe wrench having a bifurcated lever adapted to serve as a handle, each arm of said lever having a beveled curved end adapted to rest against a pipe, whereby a long side and a short side is provided on each of said arms, said lever having corresponding inclined slotted extensions adjacent to the juncture of the said arms, and in alinement with the long sides of said arms, and a post disposed between the ends of said arms, adjacent to the short sides of said arms, the combination of a link chain having the links thereof connected by link pins having projecting ends, and adapted to pass between the arms of the lever, said chain having a hook adapted for engaging the said post and the free end thereof being extended around the pipe and secured by disposing the ends of one of the link pins in the slotted extensions of the lever, substantially as shown and described.

3. In a pipe wrench, the combination of a lever adapted to serve as a handle, said lever having a beveled bifurcated bearing-end, whereby a long and a short side is provided upon the lever and a slotted extension provided upon the handle adjacent to the juncture of the arms of the bifurcated portion, and upon the long side of the lever, with a chain secured to a post, disposed between the ends of the arms of the bifurcated portion adjacent to the short side of the lever, said chain being adapted to encompass the pipe to which the wrench is applied extending around said pipe in the direction of the long side of the lever, and being disposed between the arms of the wrench and secured in the slotted extension in such a manner that one of the links impinges against the portion of the lever at the juncture of the bifurcated portion, said portion serving as a bearing to secure the link in locked engagement with the pipe, and reduce the strain upon the link pins and slotted extensions, said beveled extension of the arms serving as a fulcrum for the lever and a means for tightening the grip of the wrench when operated, substantially as shown and described.

4. In a pipe wrench, the combination of a lever having two projecting arms, each having a beveled bearing end, whereby a long and a short side is provided upon each of said arms, with a link chain having link pins with projecting ends, said chain being secured to a post seated in the bearing-ends of said arms and adjacent to the short sides thereof, said chain being disposed around the pipe, in a manner so as to pass between the extending portions of the bearing-ends on the long side of said arms and thence encompassing the pipe and being disposed between the arms of the wrench and secured in locked engagement with the lever at the juncture of the said arms, said portion of the lever serving as a bearing against which one of the links may impinge, the ends of one of the link-pins being secured in corresponding extensions provided upon said lever and having a plurality of inclined slots adjacent to the juncture of said arms and in alinement with the long side of said arms, substantially as shown and described.

In testimony that, I claim the foregoing as my invention, I have signed my name in presence of two witnesses, this 17th day of October, 1913.

ELIJAH ENOSH BROWN.

Witnesses:
JOHN McLAUGHLIN,
JOHN W. ALLEN.